Figure 4:
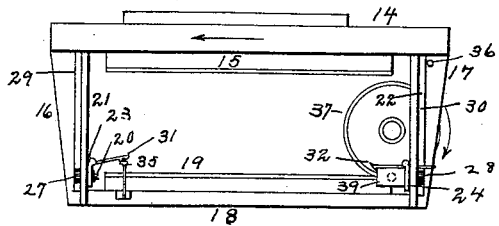
Figure 5:
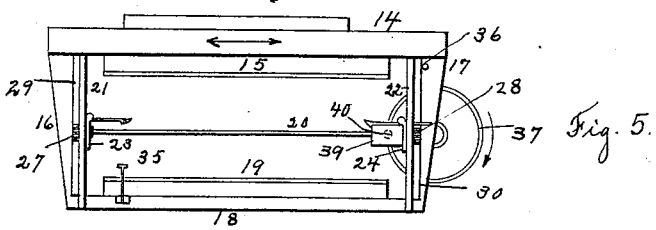
Figure 6:
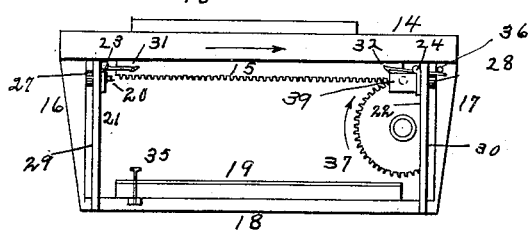
Figure 7:
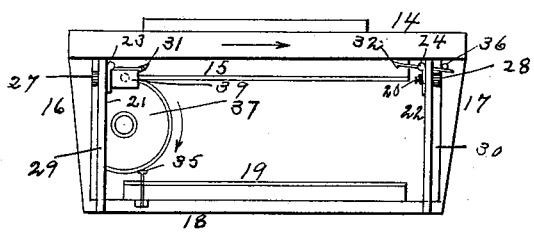
Figure 8:
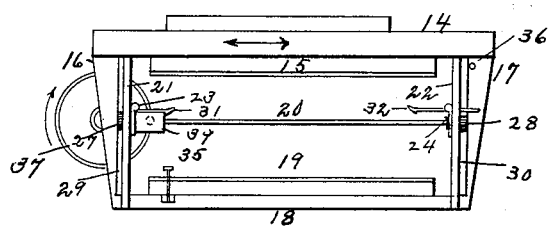
Figure 9:
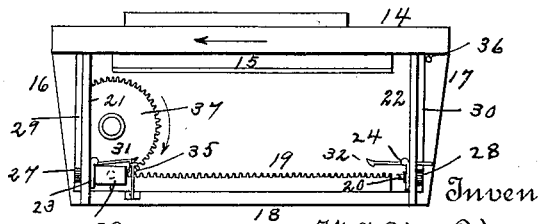

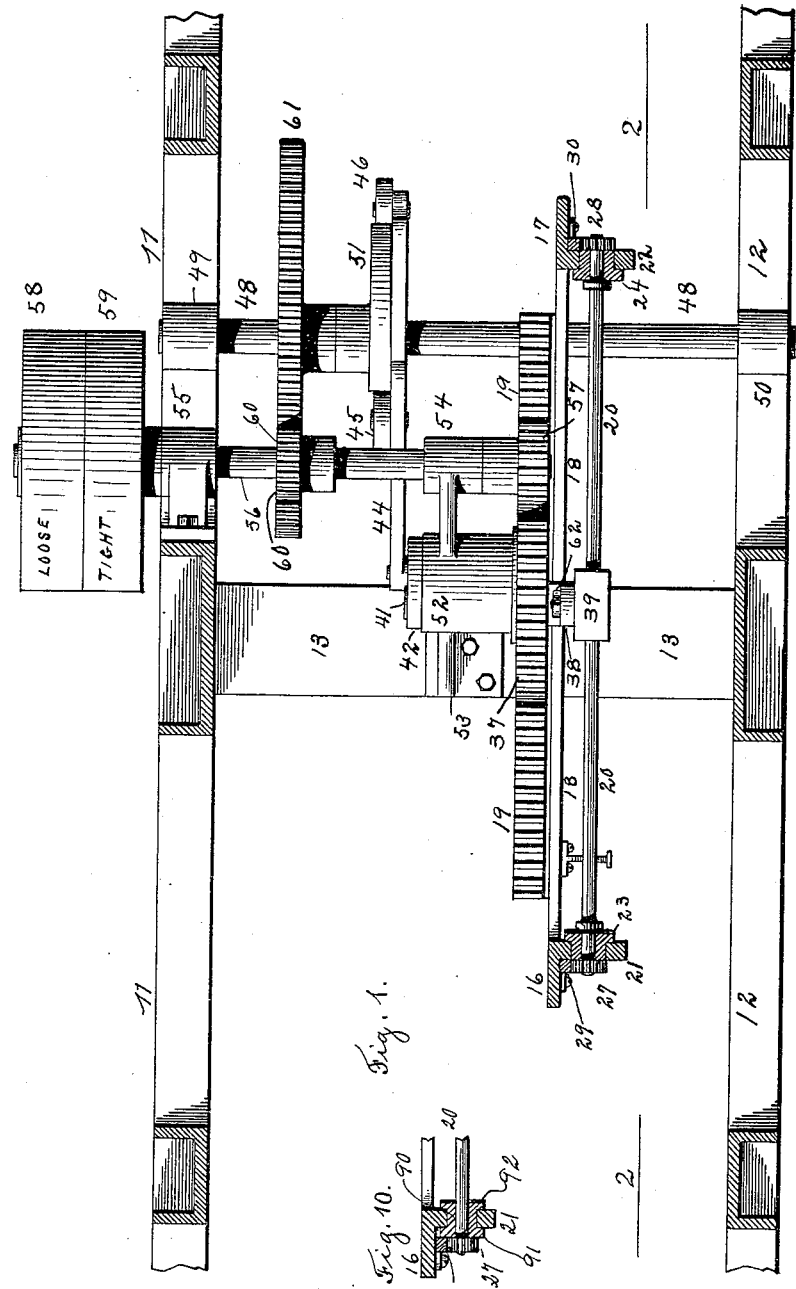

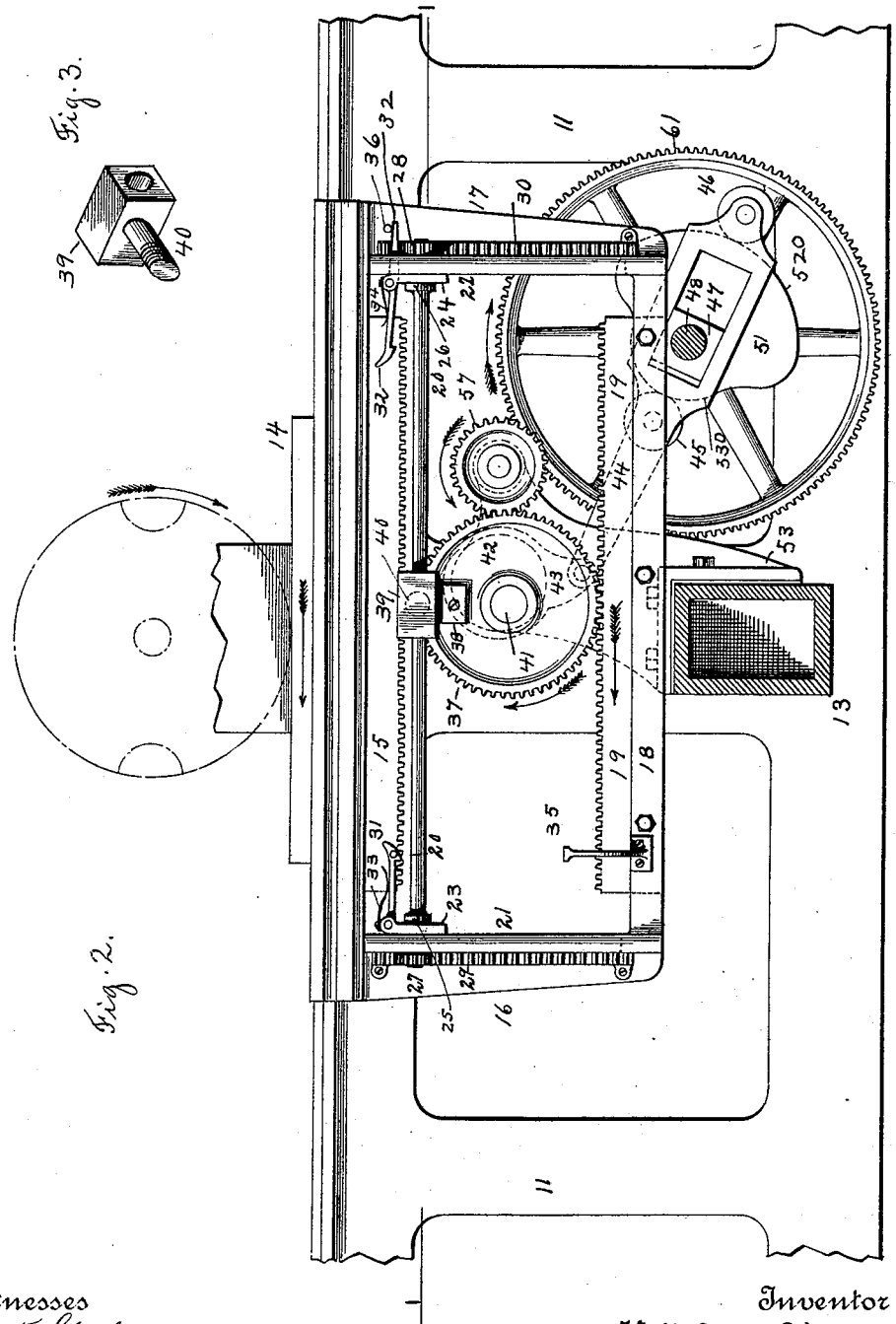

(No Model.) 3 Sheets—Sheet 3.

H. A. W. WOOD.
MECHANICAL MOVEMENT.

No. 481,128. Patented Aug. 16, 1892.

Witnesses
Chas. T. Schmelz
E. M. Healy

Inventor
H. A. Wise Wood,
By his Attorney
Louis W. Southgate

United States Patent Office.

HENRY A. WISE WOOD, OF NEW YORK, N. Y.

MECHANICAL MOVEMENT.

SPECIFICATION forming part of Letters Patent No. 481,128, dated August 16, 1892.

Application filed July 11, 1892. Serial No. 439,677. (No model.)

*To all whom it may concern:*

Be it known that I, HENRY A. WISE WOOD, a citizen of the United States, residing at New York, in the county of New York and State of New York, have invented a new and useful Improvement in Mechanical Movements, of which the following is a specification.

The aim of this invention is to produce a new and improved mechanical movement consisting of a means for converting rotary motion into rectilinearly-reciprocating motion; and to this end the invention consists of the device described and claimed in this specification and illustrated in the accompanying three sheets of drawings, in which—

Figure 1 is a sectional plan of my improved device on line 1 1 of Fig. 2. Fig. 2 is a sectional elevation on line 2 2 of Fig. 1. Fig. 3 is a detailed perspective view of the revolving crank pin or block. Figs. 4 to 9, inclusive, are diagrammatic views to illustrate the action of the mechanism, the teeth of the gearing only being shown when the same is in operation; and Fig. 10 is a sectional plan of the preferred form of abutment-blocks.

My invention, strictly speaking, relates to a mechanical movement for converting rotary motion into rectilinearly-reciprocating motion, and the same may be applied and adapted to any use or location where it is desired to use such a movement; but with this understanding I will state that my invention has been principally devised for use in connection with the reciprocating beds of printing-presses, and with the understanding that my movement may be applied and used in any desired connection without departing from the scope of my invention I will further describe my invention as applied and used in connection with a printing-press.

A printing-press bed, to secure the best results, must be run at an even speed during the forward and return stroke and stopped and started again in the reverse direction without jar or vibration.

A crank or similar movement is admirably adapted for the purpose of reversing the forward-and-backward movement of the bed; and my invention consists of the peculiar combination of means adapted to combine a crank or other movement with means for moving the bed forward or backward.

In the further description of my invention I will term the mechanism that gives the moving member or bed its direct reciprocation as the "main driving mechanism" and the mechanism that reverses the movement as the "reversing mechanism." The main driving mechanism may be of any type whatsoever that will give the bed or moving member a direct forward-and-backward reciprocation, as my invention is independent of this main driving mechanism, but consists of the combination of any driving mechanism and a peculiar reversing mechanism.

My main driving mechanism, specifically described, consists of a gear rotating in one direction disposed between two racks placed on opposite sides of the gear attached to the moving member and with which the gear alternately engages, and thereby gives the direct reciprocating movement to the bed or moving member. This mechanism will give the desired uniform forward-and-return movement of the moving member.

To secure the gradual reversal or change in the direction of travel of the moving member, I provide a crank pin or block, which is connected to a moving guide, which is raised and lowered by said crank-pin, and said crank-pin is adapted to travel horizontally on said vertically-movable guide. The rising and falling of this vertically-movable guide obviously will not effect the horizontal movement or reciprocation of the bed or moving member; but I provide means whereby the horizontal resultant movement of the crank-block will be transmitted to the bed to gradually diminish the speed of the same to a state of rest and gradually accelerate the same to the main driving speed. This reversing mechanism remains inoperative, so far as the horizontal or reciprocating movement of the bed is concerned, while the main driving mechanism is in operation, but comes into operation as the main driving mechanism becomes inoperative as the driver and gradually reverses the movement, as described.

The invention is independent of the detail herein described and may be modified an varied by a skilled mechanic, and I have shown only one specific device for carrying out my invention, though it will be understood that the same may be laid out and planned in a great variety of ways.

Referring now to the drawings for an explanation of this specific device, 11 and 12 represent the side frames of a machine to which my movement is applied. These side frames 11 and 12 are connected by a tie-beam or box-girder 13.

Mounted so as to reciprocate back and forth on the side frames 11 and 12 is the reciprocating member or bed 14. Attached to the under side of the bed 14 is a rack 15 and a downwardly-extending frame composed of the brackets 16 and 17 and the horizontal tie-beam or connecting-piece 18, to which piece 18 is attached the rack 19. The racks 15 and 19 are oppositely disposed, as shown. Also formed with the brackets 16 and 17 are the extending ledges 21 and 22, which ledges are machined or finished off and have vertical slots formed therein, as shown in Fig. 1. Fitting into these slots so as to be capable of a nice rising-and-falling movement are the blocks 23 and 24, and journaled in these blocks 23 and 24 is the shaft 20, and the blocks are held in place on the shaft by collars 25 and 26, secured to the shaft. Also attached to brackets 16 and 17 are the vertical racks 29 and 30, and on the ends of the shaft 20 are secured small pinions 27 and 28, which mesh with the vertical racks 29 and 30. Thus it will be seen that the shaft 20 is a "squaring shaft," as called in the art—that is, a shaft which if power is applied at any point to raise or lower the same by means of the pinions 27 and 28 and the racks 29 and 30 will be raised or lowered evenly at both ends and will be always kept square or horizontal in the particular device under consideration.

Fastened to the block 23 is the latch or catch 31, and a similar latch or catch 32 is fastened or journaled to the block 24. These latches 31 and 32 are oppositely disposed and point toward each other, as shown. The latch 32 extends out through the slot in the ledge 22, as shown. The normal position of these latches is in substantially a horizontal line, and the same are held by suitable stops from turning or dropping below this line, and the latches are normally held in this horizontal line by means of springs 33 and 34, as shown. The latches are tripped or raised by means of a projection or arm 35 and pin 36—that is, the latch 31 is raised when the shaft 20 is in its lowest position, and the latch 32 is raised when the shaft 20 is in its highest position.

The driving-pinion of the machine, which engages and co-operates with the racks 15 and 19, is designated by 37, and on the side of this pinion or gear 37 is fastened a bracket or arm 38, and journaled in this bracket 38 is the extending shaft 40 of the crank pin or block 39, and the crank-pin may be held in place, if desired, in the bracket 38 by a nut 62, secured on the end of the shaft 40.

I use the term "crank pin" or "block" to refer to the part 39, because this in one sense is a crank-pin in that it is a member mounted in a bracket or crank-arm, and it is a crank-block in that it is free to turn in the crank-arm or bracket. Therefore by the term "crank pin" or "block" I mean to include both a pin mounted in the arm or a block mounted on a pin or shaft which is free to turn on the block and which will be hereinafter described. Thus, in the broadest sense, the crank pin or block is a crank element. The crank-pin 39 is free to revolve in the bracket 38, and the crank-pin 39 has a hole bored through the same, in which the shaft 20 is fitted. By means of this mechanism, as described, as the pinion 37 revolves the shaft 20 will be raised and lowered, and will always be kept square or horizontal by means of the squaring device before referred to. The gear 37 is mounted on a shaft 41, which shaft 41 is mounted in the eccentric bushing 42, which eccentric bushing has an extending arm 43, and to this extending arm 43 is connected the yoke 44. This yoke 44 has rollers 45 and 46 on the same and is mounted on the square block 47, fitted on the shaft 48, which is mounted in bearings 49 and 50, formed or fastened to the side frames 11 and 12. A cam 51 is disposed between said rollers 45 and 46, and said cam 51 has two faces or surfaces 520 and 530, which are connected by easy inclines, as shown. Thus as the cam revolves the yoke 44 will be moved to and fro, and thereby the bearing 42 oscillated and the gear 37 raised and lowered to engage either rack 15 or 19, as desired. The eccentric bushing before referred to is journaled in a bearing 52, formed on the bracket 53, which is bolted to the tie-beam 13, and another bearing 54 is also formed in said bracket 53. Journaled in this bearing 54 and in a bracket 55, attached to the side frame 11, is a shaft 56, on which are mounted the usual loose and tight pulleys 58 and 59, which may, if desired, constitute the means whereby power is transmitted to the machine.

Fastened on the end of the shaft 56 is a pinion 57, which pinion 57 engages with and drives the main driving-gear 37. Also fastened on the said shaft 56 is the pinion 60, which engages with and drives a gear 61, fast on shaft 48. The gear 37 makes three revolutions, as hereinafter described, for each complete reciprocation of the bed—one revolution in engagement with rack 15, one revolution in engagement with rack 19, and a half-revolution for each period while the reversing mechanism is in operation. The reduction between the gears 57 and 37 is one to two and between pinion 60 and gear 61 is six to one, whereby the cam 51 will turn once for every three revolutions of gear 37, or once for every complete reciprocation of the bed.

The operation of the raising and lowering gear forms no part of my invention, and the same will not be further described at length, as the same has been shown, described, and claimed in the application to Winfield S. Huson, filed March 31, 1892, Serial No. 427,151.

The operation of my device is apparent and is as follows: As the gear 37 revolves the crank pin or block 39 will raise and lower the shaft 20. This will not effect the horizontal reciprocation of the moving member until the block 39 abuts against the sliding bearing 23 or 24 through collar 25 or 26. When this happens, the movement of the bed will be retarded by the block 39 as the same rotates. The latch 31 or 32, as the case may be, will keep block 39 and the bearing 23 or 24, as the case may be, in engagement. After the moving member has been brought to a state of rest by the block 39 the further movement of the block will start and accelerate the bed and will deliver the bed to the main driving mechanism at the proper speed.

Although I have shown for the sake of simplicity the crank-block 39 as mounted on the driving-pinion 37, it will be understood, of course, that the crank-block 39 may be mounted upon any crank-arm whether the same is connected with or independent of the driving mechanism, for, as before stated, any main driving mechanism may be used and the block 39 simply mounted on a crank-arm. It will be seen that the shaft 20 forms a guide for the crank-block and that the bearings or journal-boxes 23 and 24 and the collars 25 and 26 form abutments or stops or an operating means whereby the block 39 comes into operative connection with the bed, though of course the block 39 could be made to strike directly on the ledges 21 or 22 or directly against the bearings 23 and 24 by omitting collars 25 and 26, as hereinafter described. In other words, the crank-block is simply placed on a guide and brought into operative connection with the bed to reverse the same, as the bed while operated by the main driving mechanism acquires considerable inertia, the function of the block being simply to retard this motion and start the same in the opposite direction. Therefore it is not always necessary to use latches or any means for positively locking the block to the bed, though the latches are desirable, as hereinafter described. Thus it is within the scope of my invention to make any operative connection between the block and bed whereby the block will be brought into operative connection with the bed to reverse the movement, whether or not a locking means is used to positively secure the same to the bed. Further, it will be seen that it is not absolutely necessary for the crank-block to revolve in the crank-arm, as shown in the particular device described, as of course a simple crank-pin could be used working in a slotted guideway or between two shafts and accomplish the same function; but in the particular device under consideration I consider that the same is a guideway with abutments against which the block will firmly come to reverse the movement.

The preferred form of abutment is shown in Fig. 10, in which the collars on the shaft are omitted, and the abutment-block in this case simply consists of a journal-box 90, square in cross-section, which has two collars 91 and 92, which hold the same rigidly to the ledge 21. This form is the preferred form, because while the block 39 abuts against the collar 92 there will be no friction between the same, as would be if the block abutted against the collar 23, mounted on the shaft 20.

It will be seen that the abutment-blocks form a means whereby the crank-block can strike or abut against the bed and that the shaft 20 simply forms a means for raising and lowering the abutment-blocks to correspond to the vertical rising-and-falling movement of the crank-block, so that the crank-block will accurately engage the abutment-blocks when the reversing mechanism comes into operation. Therefore I consider it within the scope of my invention to use any means that will operate the abutment-blocks vertically, so that the same would properly engage the crank-block no matter whether the blocks are moved from the main or reversing mechanism or from the crank-block itself, as many other means and ways could be devised for raising and lowering the abutment-blocks so that the same would be kept in contact with the crank-block, while the crank-block acts to reverse the movement and to properly return the abutment-blocks while the crank-block is not in contact with the same, so that the crank-block can again properly engage the abutment-blocks. The action of the complete mechanism can be followed from the diagrams.

In Fig. 4 the bed or moving member is shown as just completing its direct movement to the left, the bearing 24 and latch 32 engaging the crank-block 39. Now during the next quarter-revolution of gear 37 the bed will be gradually retarded and brought to a state of rest, as the crank will gradually slow down the movement. The latches are used only to keep the block and bed in absolute and correct engagement. This quarter-revolution of the gear 37 will bring the parts to the position shown in Fig. 5, or with the bed at a state of rest at its left-hand extreme. During the next quarter-revolution of the gear 37 the bed will be moved to the right a distance equal to the radius at which the block 39 is set on gear 37, which is the pitch radius of the gear 37, at a speed gradually increasing from zero to that of the direct driving mechanism, and during this quarter-revolution of the gear 37 the parts will be brought to the position shown in Fig. 6, in which the bed is just being taken by the main driving mechanism or gear 37 and is released from block 39, as during the last portion of the vertical movement of the block 39 the latch 32 will strike on stud 36, and thereby disengage from block 39. During this half-revolution of gear 37 the gear will be raised by the mechanism before described, so that the same will now engage rack 15. Now during the next complete revolution of gear 37 the bed will be moved to the right a distance equal to the pitch circumference of the gear 37, which is substantially the length of the racks, and the parts will be brought to the position shown in Fig. 7 and the block 39 will engage the journal or box 23. Now during the next quarter-revolution of gear 37 the bed will be gradually stopped in a distance equal to the pitch radius of the gear 37, or the parts will be brought to assume the position shown in Fig. 8, which is the right-hand extreme of the movement of the bed. Now during the next half-revolution of gear 37 the bed will be started on its movement to the left at a speed gradually increasing from zero to the maximum and the parts will be brought to assume the position shown in Fig. 9, in which the catch 31 has just been raised by striking the arm 35 and the bed is being delivered by the reversing mechanism to the main driving mechanism. During this last half-revolution of gear 37 the same has been lowered to engage rack 19, as shown, and now during the next complete revolution of gear 37 the parts will be brought back to the position shown in Fig. 4 and the cycle thus completed. Thus the amount of travel of the bed is a pitch circumference of gear 37 plus two pitch radii or a pitch diameter. The travel may be made larger of course, if desired, by increasing the length of the racks 15 and 19. It will be seen that the bed is stopped by abutting against the crank-block and is started again by the crank-block pushing on the same. Thus very little strain will come on the latches, and the same are only used to keep the bed in exact engagement with the crank-block while the reversing action takes place, so that if the machine should be stopped while the reversing mechanism is in operation the bed would be again properly started.

The construction of parts and the shape of the brackets and way in which the gears are mounted may of course be varied by a skilled designer without departing from the scope of my invention as expressed in the claims.

Having thus fully described my invention, what I claim, and desire to secure by Letters Patent, is—

1. The combination of the reciprocating member or bed with mechanism for reciprocating the same, and a reversing mechanism comprising a crank element, and a vertically-moving guide for said element mounted on the bed, substantially as described.

2. The combination of the reciprocating member or bed with mechanism for reciprocating the same, and a reversing mechanism comprising a crank element, and a guide in constant engagement with said element, said guide being mounted on the bed, substantially as described.

3. The combination of the reciprocating member or bed with mechanism for reciprocating the same, and a reversing mechanism comprising a crank pin or block, a vertically-moving guide for said crank pin or block mounted on the bed, and means for bringing said crank pin or block into operative connection with the bed to reverse its movement, substantially as described.

4. The combination, with the reciprocating member or bed and mechanism for reciprocating the same, of a reversing mechanism comprising a crank pin or block, a guide mounted on the bed in constant engagement with said crank pin or block, and means for bringing said crank pin or block into operative connection with the bed to reverse its movement, substantially as described.

5. The combination, with the reciprocating bed or member and mechanism for reciprocating the same, of a reversing mechanism comprising a crank pin or block, a moving guide for said crank pin or block mounted on the bed, and means for locking said crank pin or block to said bed, so that said crank pin or block will reverse the movement of said bed, substantially as described.

6. The combination, with the reciprocating bed or member and mechanism for reciprocating the same, of a reversing mechanism comprising a revolving crank-arm, a block mounted so as to revolve in said crank-arm, and a moving guide mounted on the bed in constant engagement with said block, whereby said block will be kept from turning on its axis, substantially as described.

7. The combination, with the reciprocating bed or member and mechanism for reciprocating the same, of a reversing mechanism comprising a revolving crank-arm or member, a block mounted so as to revolve or turn in said crank-arm, a moving guide mounted on the bed in constant engagement with said crank-block, whereby said crank-block will be kept from turning on its own axis, and means for bringing said crank-block into operative connection with the bed to reverse its movement, substantially as described.

8. The combination, with the reciprocating bed or member and mechanism for reciprocating the same, of a reversing mechanism comprising a crank pin or block, a guide mounted on the bed so as to be vertically movable thereon, said crank pin or block being in constant engagement with said guide, and abutments against which said pin or block is adapted to bear to reverse the movement of the bed, substantially as described.

9. The combination, with the reciprocating bed or member and mechanism for reciprocating the same, of a reversing mechanism comprising a crank-pin, a vertically-movable guide in constant engagement with said pin, and abutments in said guide for said crank-pin, said guide being connected to move vertically on the bed, but so that any horizontal movement transmitted to said guide or to its abutments will be transmitted to said bed, substantially as described.

10. The combination, with the reciprocating bed or member and mechanism for reciprocating the same, of a reversing mechanism comprising a crank pin or block, a guide for said crank pin or block mounted so as to be vertically movable on the bed, and means whereby the vertical movement transmitted from the crank pin or block to said guide will be transmitted to a plurality of points, so that the guide will always be kept in a substantially horizontal line, substantially as described.

11. The combination, with the reciprocating bed or member and mechanism for reciprocating the same, of a reversing mechanism comprising a crank-pin and a guide for said crank-pin, said guide being mounted in boxes or journals which are mounted on the bed so as to be capable of vertical motion, said bearings thereby forming abutments for the crank-pin, whereby said crank-pin will reverse the movement of the bed, substantially as described.

12. The combination, with the reciprocating member or bed and mechanism for reciprocating the same, of a reversing mechanism comprising a crank pin or block, a shaft which said crank pin or block constantly engages, which shaft thereby forms a guide for the crank-block, and bearings carrying said shaft and mounted so as to be vertically movable on the bed, said bearings also forming abutments against which the crank-block is adapted to bear to reverse the movement of the bed, substantially as described.

13. The combination, with the reciprocating bed or member and mechanism for reciprocating the same, of a reversing mechanism comprising a crank pin or block, a guide mounted on said bed so as to be capable of vertical movement thereon, said guide having abutments against which the crank-block is adapted to bear, and also means for locking the crank-block in engagement with the abutment-block, substantially as described.

14. The combination, with the reciprocating bed or member and mechanism for reciprocating the same, of a reversing mechanism consisting of a crank pin or block, and a shaft 20, with which said crank pin or block is in constant engagement and which forms a guide for said crank-pin, and abutment-blocks or bearings mounted on the bed so as to have a vertical movement thereon, said abutment-blocks carrying means whereby the crank-block may be locked in engagement with the same, substantially as described.

15. The combination, with the reciprocating bed or member and mechanism for reciprocating the same, of a reversing mechanism comprising a guide mounted so as to be vertically movable on the bed, a crank-pin in engagement with said guide, and abutments against which the crank-pin is adapted to bear to reverse the movement of the bed, and latches for holding the crank-pin in engagement with the abutment-blocks, and means whereby the vertical movement of said guide will release said latches at the proper time, substantially as described.

16. The combination, with the reciprocating bed or member and a mechanism for reciprocating the same, of a reversing mechanism comprising a crank pin or block, a shaft 20, which said crank pin or block constantly engages, abutment-blocks mounted vertically movable on the bed, against which the crank-block is adapted to bear, latches carried by said abutment-blocks, and pins or projections mounted on the bed, adapted to release said latches, substantially as described.

17. The combination, with the reciprocating bed or member and mechanism for reciprocating the same, of a reversing mechanism comprising the crank-block 39 and shaft 20, which said crank-block engages, the abutment-blocks in which said shaft 20 is journaled, said blocks being mounted vertically movable on the bed, the racks 29 and 30, also mounted on the bed, and pinions 27 and 28, mounted on said shaft and engaging said racks, substantially as described.

18. The combination, with the reciprocating bed or member and mechanism for reciprocating the same, of a reversing mechanism consisting of the crank-block 39, the shaft 20 in constant engagement with said crank-block, the abutment-blocks in which said shaft 20 is journaled, said blocks being mounted vertically movable on the bed, the racks 29 and 30, also mounted on the bed, pinions 27 and 28 on said shaft, engaging said racks, and latches 31 and 32, also carried by said blocks 23 and 24, substantially as described.

19. The combination, with the reciprocating bed or member, of the main driving mechanism consisting of two racks, a pinion arranged so as to alternately engage said racks, a reversing mechanism comprising a crank-block mounted on said pinion, a moving guide mounted on the bed, which said crank-block constantly engages, and abutments formed with said guide against which said crank-block is adapted to bear to reverse the movement of the reciprocating member, substantially as described.

20. The combination, with the reciprocating bed or member and mechanism for reciprocating the same, of a reversing mechanism comprising a crank element, and an abutment-block mounted in bearings on the bed so as to be capable of a vertical movement, and means for raising and lowering the abutment-block, so that the crank element may properly connect to the same to reverse the movement of the bed, substantially as described.

21. The combination, with the reciprocating bed or member and mechanism for reciprocating the same, of a reversing mechanism comprising a crank element, and abutment-blocks mounted in bearings on the bed, so as to be capable of a vertical movement, and means operated from the reversing mechanism acting to raise and lower said abutment-blocks, substantially as described.

22. The combination, with the reciprocating bed or member and mechanism for reciprocating the same, of a reversing mechanism comprising a crank element, and abutment-blocks mounted in bearings on the bed so as to be capable of a vertical movement, and connections from the crank-pin adapted to raise and lower said abutment-blocks, whereby the crank-block will properly engage the abutment-blocks to reverse the movement of the bed, substantially as described.

In testimony whereof I have hereunto set my hand in the presence of two subscribing witnesses.

H. A. WISE WOOD.

Witnesses:
LOUIS W. SOUTHGATE,
ELIZABETH M. HEALY.